United States Patent [19]
Shekalim

[11] Patent Number: 5,291,086
[45] Date of Patent: Mar. 1, 1994

[54] ELECTRICAL ACTUATOR FOR VALVE OR OTHER DEVICE

[75] Inventor: Avraham Shekalim, Nesher, Israel

[73] Assignee: Eureka Technologies Ltd., Haerek, Israel

[21] Appl. No.: 889,891

[22] Filed: May 29, 1992

[30] Foreign Application Priority Data

Jun. 4, 1991 [IL] Israel ............................ 98358

[51] Int. Cl.⁵ .................... H02K 7/06; G05D 13/10
[52] U.S. Cl. .................................. 310/80; 310/68 E; 137/53
[58] Field of Search ................... 73/535–538; 310/68 E, 80; 415/13, 25; 137/53; 251/129.01, 129.11; 200/80 R

[56] References Cited

U.S. PATENT DOCUMENTS

| | | | |
|---|---|---|---|
| 3,421,414 | 1/1969 | Peale | 91/458 |
| 3,532,082 | 10/1970 | Clouse | 123/140 |
| 4,123,942 | 11/1988 | Rumyantsev | 73/535 |
| 4,768,482 | 9/1988 | Cheng et al. | 123/363 |

FOREIGN PATENT DOCUMENTS

| | | |
|---|---|---|
| 2064185 | 8/1971 | Fed. Rep. of Germany . |
| 2224757 | 12/1973 | Fed. Rep. of Germany . |
| 2224758 | 12/1973 | Fed. Rep. of Germany . |
| 2282045 | 3/1976 | France . |
| 2414222 | 8/1979 | France . |
| 1217511 | 12/1970 | United Kingdom . |
| 1230997 | 3/1971 | United Kingdom . |

*Primary Examiner*—Steven L. Stephan
*Assistant Examiner*—C. LaBalle
*Attorney, Agent, or Firm*—Benjamin J. Barish

[57] ABSTRACT

An electrical actuator for actuating a valve or other device includes an electrical motor rotating a rotary member and centrifugal body. The centrifugal body is mounted to the rotary member and is biased to normally assume an inner position with respect to the rotary axis of the rotary member, and to move to an outer position by centrifugal force when the rotary member rotates. An actuator pin is normally biased to a non-actuating position but is movable to an actuating position, to actuate a valve or other device, when the centrifugal body is moved to its outer position by centrifugal force upon the rotation of the rotary member by the electric motor.

15 Claims, 4 Drawing Sheets

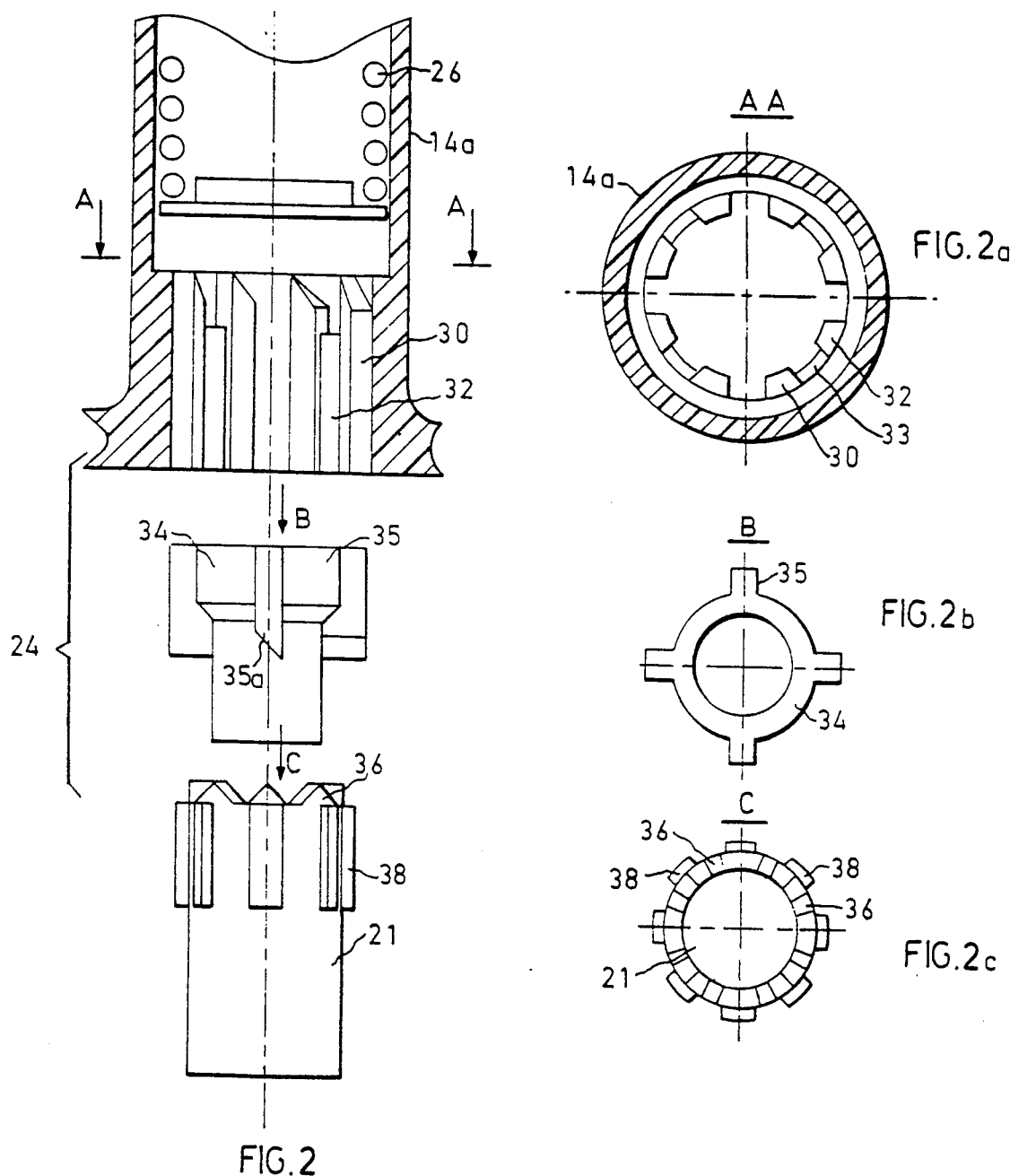

ELECTRICAL ACTUATOR FOR VALVE OR OTHER DEVICE

FIELD AND BACKGROUND OF THE INVENTION

The present invention relates to an electrical actuator for actuating a valve or other like device. The invention is particularly useful to replace the conventional solenoids included in actuators for valves and like devices.

The conventional solenoid-actuated valve usually requires about two watts of electric power and six or twelve volts for actuating the valve, and sometimes may require the use of an insulating tube to enclose the solenoid for protective purposes. Moreover, such solenoid-actuated valves frequently malfunction if used in controlling the flow of water having a high dirt content.

OBJECTS AND SUMMARY OF THE INVENTION

An object of the present invention is to provide an electrical actuator having advantages in the above respects over the conventional solenoid actuators used for actuating valves and like devices.

More particularly, an object of the present invention is to provide an electrical actuator which requires substantially less power, can be operated at substantially lower voltages, and is substantially less sensitive to malfunction, than the conventional solenoid actuators now used for controlling valves.

According to the present invention, there is provided an electrical actuator for actuating a valve or other device, comprising: an electrical motor having a rotary shaft; a rotary member coupled to said rotary shaft so as to be rotated thereby; a centrifugal body movably mounted to said rotary member and biassed so as normally to assume an inner position with respect to the rotary axis of the rotary member, and to move to an outer position by centrifugal force when the rotary member rotates; an actuator pin biassed to a non-actuating position but movable to an actuating position; a housing enclosing the rotary member and centrifugal body and open at one end; a diaphragm seal closing the open end of the housing and displaceable outwardly with respect to the housing when the actuator pin is moved to its actuating position; and coupling means between said centrifugal body and said actuator pin for actuating said actuator pin to its actuating position, and thereby for displacing the diaphragm outwardly with respect to the housing, when the centrifugal body is moved to its outer position by centrifugal force upon the rotation of said rotary member by said electric motor.

According to further features in the described preferred embodiment, the actuator pin is reciprocatably mounted for movement to its actuating and non-actuating positions; also, the centrifugal body is pivotally mounted to the rotary member and is biassed by its own weight so as normally to assume the inner position.

More particularly, in the described preferred embodiment, the centrifugal body includes first and second legs on opposite sides of its pivotal mounting. The first leg is normally located inwardly of its pivotal mounting and is of a weight to bias the leg to an inner position, but pivotal outwardly by centrifugal force upon the rotation of the rotary member; and the second leg is coupled via the coupling means to the actuator member to actuate it upon the movement of the first leg outwardly by centrifugal force upon rotation of the rotary member.

According to further features in the described preferred embodiment, the coupling means comprises an interposer pin engageable with one end of the actuator pin the opposite end of the actuator pin engaging the diaphragm seal. The interposer pin is formed with a shoulder engageable by the second leg of the centrifugal body to move the interposer pin to its actuating position upon the movement of the first leg of the centrifugal body outwardly by centrifugal force during rotation of the rotary member. More particularly, there are a plurality of centrifugal bodies each pivotally mounted on the rotary member, and the shoulder on the interposer pin is an annular shoulder engageable by a leg of all the centrifugal bodies.

According to still further features in the described preferred embodiment, the assembly further includes an extension-retraction mechanism cooperable with the actuator member for sequentially extending and retracting the actuator member after each actuation thereof and for retaining it in the respective position until the next actuation thereof.

An electrical actuator constructed in accordance with some or all of the foregoing features is particularly useful in shut-off valves for the remote control of automatic irrigation systems, and provides a number of advantages in such an application as compared to the conventional solenoid-actuators now used.

Thus, whereas the existing solenoid-actuators require large starting currents, in the electrical actuator of the present invention the motor load is minimal at starting and increases gradually with increased speed; therefore, while the actuator takes slightly more time to complete its operation, the power and voltage requirements are substantially less than in the conventional solenoid actuator. For example, whereas the conventional solenoid actuator usually requires 2-watts of power and a 6-24 volts DC power supply, the electrical actuator of the present invention requires but 4.5 volts DC, 0.5-watt power thereby enabling the use of three conventional 1.5-volt batteries or solar cells.

In addition, the actuator of the present invention may be implemented in a completely "dry" assembly, thereby making it ideally suited for valves controlling water having high dirt contents with less chance of malfunction. Further, the novel electrical actuator may be designed to produce a large linear displacement of the actuator member, as compared to conventional solenoid actuators, which is highly advantageous in many applications. Still further, the novel electrical actuator requires but two electrical conductors thereby enabling simple and inexpensive control.

The foregoing advantages enable the novel electrical actuator to be constructed less expensively and more compactly as compared to the conventional solenoid actuators.

Further features and advantages of the invention will be apparent from the description below.

BRIEF DESCRIPTION OF THE DRAWINGS

The invention is herein described, by way of example only, with reference to the accompanying drawings, wherein:

FIG. 2 is an exploded view of the extension-retraction mechanism included in the assembly of FIG. 1;

FIG. 2a, 2b and 2c are views along lines A—A, B and C, respectively, of FIG. 2;

DESCRIPTION OF PREFERRED EMBODIMENTS

Figure 1:
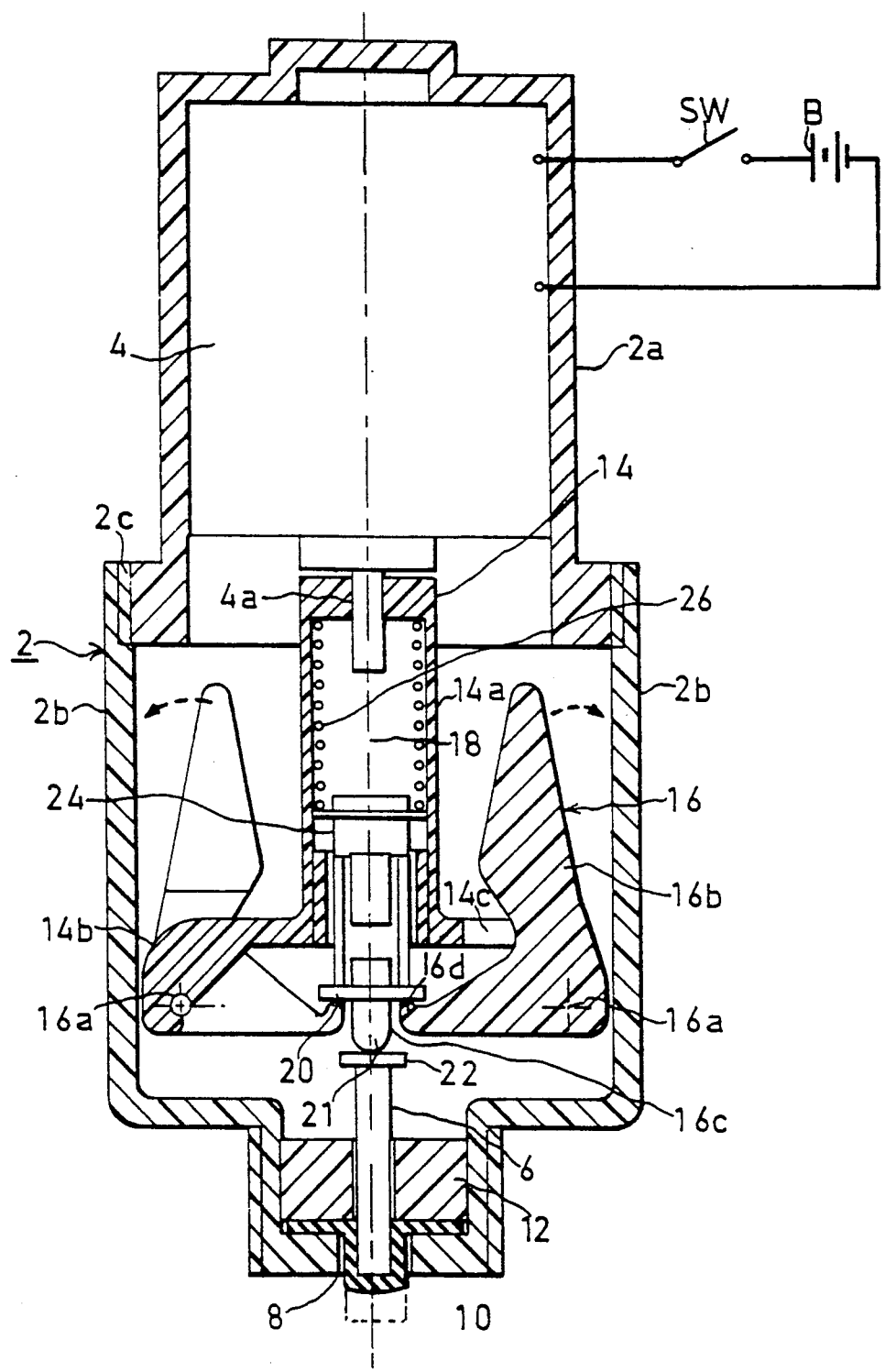
FIG. 1 is a longitudinal sectional view illustrating one form of electrical actuator constructed in accordance with the present invention.

The electrical actuator illustrated in FIG. 1 comprises a housing, generally designated 2, constituted of a first section 2a for housing an electric motor 4, and a section 2b for housing the remainder of the assembly and secured to section 2a by threads 2c. The portion of the assembly housed within section 2b includes an actuator member in the form of a pin 6 which is reciprocatably mounted for movement through an opening 8 formed in housing section 2b, from a normal retracted position as illustrated in FIG. 1, to an extended position projecting through opening 8 for actuating a valve or other like device (not shown). Housing section 2b further includes a diaphragm seal 10 secured between its end wall and a bushing 12, to cover opening 8 and the actuator pin 6, and thereby to seal the electrical actuator against the entry of dirt.

Each actuation of pin 6 (downward movement in FIG. 1) actuates the valve assembly (not shown) and also stresses the diaphragm seal 10 such that when the actuation is terminated, diaphragm seal 10 returns pin 6 to its normal position (i.e., its upper position in FIG. 1).

Electric motor 4 includes an output shaft 4a coupled to a rotary member 14 to rotate it upon the energization of the motor. Rotary member 14 includes a hollow sleeve 14a fixed at one end to the motor shaft 4a, and terminating at its opposite end in a bell-shaped section 14b. The latter section pivotally mounts a pair of centrifugal bodies 16 on the opposite sides of axis 18 which is common to the motor shaft 4a and the actuator pin 6. Each of the centrifugal bodies 16 is pivotally mounted at 16a to the inner face of the bell-section 14b of rotary member 14, and the latter section is provided with a cutout 14c for accommodating each of the centrifugal bodies 16.

Each of the centrifugal bodies 16 includes two legs 16b, 16c located on opposite sides of its pivotal mounting 16a and forming an angle of slightly less than 90° to each other. Leg 16b is located slightly inwardly of its pivot point 16a, and is of a weight to normally bias the centrifugal body to an inner position with respect to its pivot point, as illustrated in FIG. 1; each centrifugal body, however, is pivotal (in the direction of the arrows in FIG. 1) to an outer position upon its rotation by rotary member 14.

Leg 16c of each centrifugal body 16 terminates in an axially-extending tip 16d which engages an annular shoulder 20 formed on an interposer pin 21 coaxial with axis 18. Pin 21 has a rounded tip engageable with the end face 22 of the actuator pin 6, such that pivoting of the centrifugal bodies to their outer positions by the rotation of rotary member 14, moves pin 21, and thereby actuator pin 6 parallel to axis 18, against the action of the diaphragm seal 10 which tends to retain pin 6 in its retracted position.

Interposer pin 21 is coupled for reciprocal movement within section 14a of the rotary member 14 by means of an extension-retraction mechanism, generally designated 24. This mechanism sequentially extends and retracts pin 21 as a result of each energization of the rotary motor 4, and retains the pin in its respective position (extended or retracted) until the next actuation of the pin by the next energization of the motor.

The extension-retraction mechanism 24 cooperates with a spring 26 disposed within the hollow section 14a of rotary member 14. Spring 26 normally urges mechanism 24, and interposer pin 21, outwardly to the extended position of the pin, but is normally retained in its retracted position by the weight of centrifugal bodies 16. Mechanism 24 is effective, however, upon energization of electric motor 4, to move bodies 16 to their outer positions, and thereby also to move pin 21 to its extended position and to retain it in such a position, until the next energization of the electric motor, at which time it moves pin 21 to its retracted position and retains it in such position until the next energization of the electric motor.

Many extension-retraction mechanisms are known, such as used in conventional ball-point pens, which may be used for mechanism 24 in FIG. 1. One example of an extension-retraction mechanism is illustrated in FIGS. 2 and 2a-2c.

As illustrated in FIGS. 2 and 2a-2c, the extension-retraction mechanism 24 includes the lower part of hollow section 14a of the rotary member 14. This lower part is formed, in its inner face, with a plurality of axially-extending long slots 30 alternating with a plurality of axially-extending short slots 32 and joined by a bevel surface 33 at their upper ends. Mechanism 24 further includes a rotatable collar 34 formed with a plurality of axially-extending splines 35 around its outer circumference, with each spline terminating in a bevelled tip 35a. Bevelled tips 35a of collar 34 cooperate with a plurality of teeth 36 formed around the upper end of the interposer pin 21. The upper end of pin 21 is similarly formed with a plurality of axially-extending splines 38 around its outer circumference receivable within the long slots 30 or the short slots 32 formed in the lower end of section 14a of the rotary member 14.

Figure 3A:
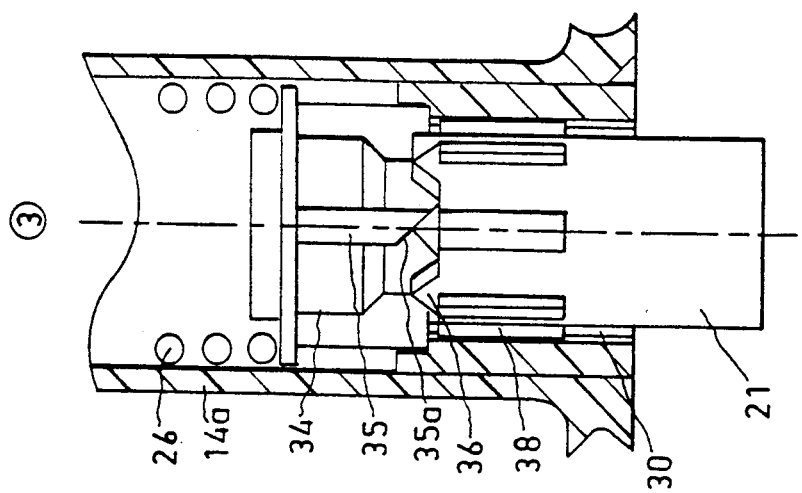
FIGS. 3a, 3b and 3c are fragmentary views illustrating the operation of the extension-retraction mechanism of FIG. 2.
Figure 3B:
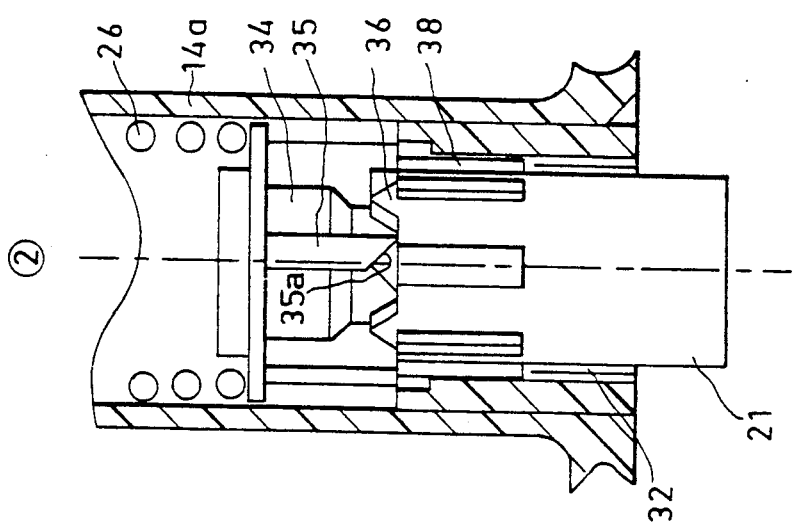
Figure 3C:
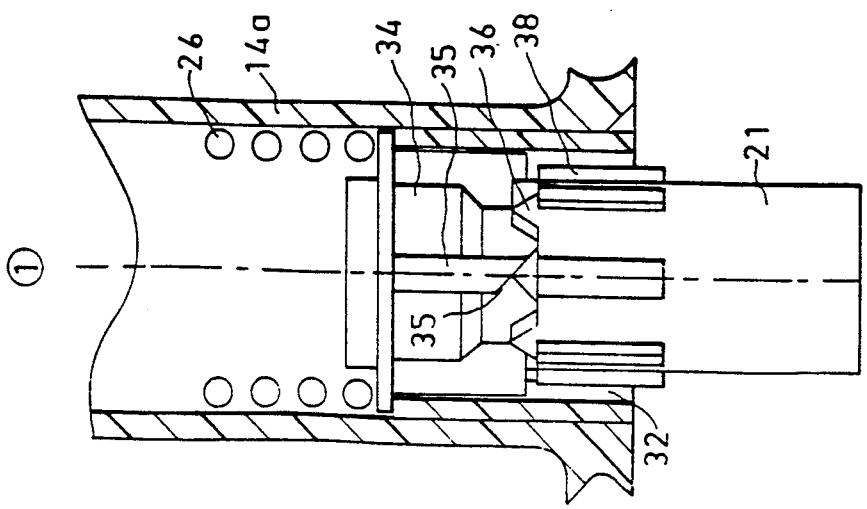

FIGS. 3a-3c illustrate the operation of the electrical actuator, and particularly of the extension-retraction mechanism 24.

It will be first assumed that the retraction-extension mechanism is in the condition illustrated in FIG. 3a, with the splines 38 at the upper end of pin 21 disposed in the short slots 32 of section 14a of the rotary member, so that the pin is in its extended position.

Upon energization of electric motor 4, it rotates rotary member 14, thereby pivoting the centrifugal bodies 16 to their outer positions, whereupon their legs 16c, engageable with shoulder 20 of pin 21, move the pin to its inner position as shown in FIG. 3b. This movement of pin 21 causes a slight rotation of collar 34, by the engagement of the bevelled spline tip 35a of the collar with a tooth 36 of the pin. When the energization of electric motor 4 is terminated, the centrifugal bodies 16 return to their initial positions, permitting spring 26 to move the pin outwardly (downwardly). During this return movement of the pin it is stepped one position by the bevel surface 33 so that its splines 36 now seat within the long slots 30 at the lower end of section 14a, and thereby retain the pin in its retracted position, as shown in FIG. 3, until the next actuation of the electric motor 4.

When interposer pin 21 is actuated to its extended position, it moves actuator pin 6 to its actuated position (downwardly in FIG. 1) to actuate the valve assembly (not shown). This also stresses the diaphragm seal 10 so that when pin 21 returns to its retracted position, the diaphragm seal also returns pin 6 to its normal, non-actuated position.

Since the centrifugal bodies 16 are biassed by their own weight to their inner positions, the moment of inertia of the rotating parts is decreased, and therefore the starting current to the motor 4 is relatively low. Thus, whereas the existing solenoid actuators require 6–24 volts DC and a 2-watt power supply, the electrical actuator described herein requires but 4.5 volts DC and an 0.5-watt power supply.

Figure 4:
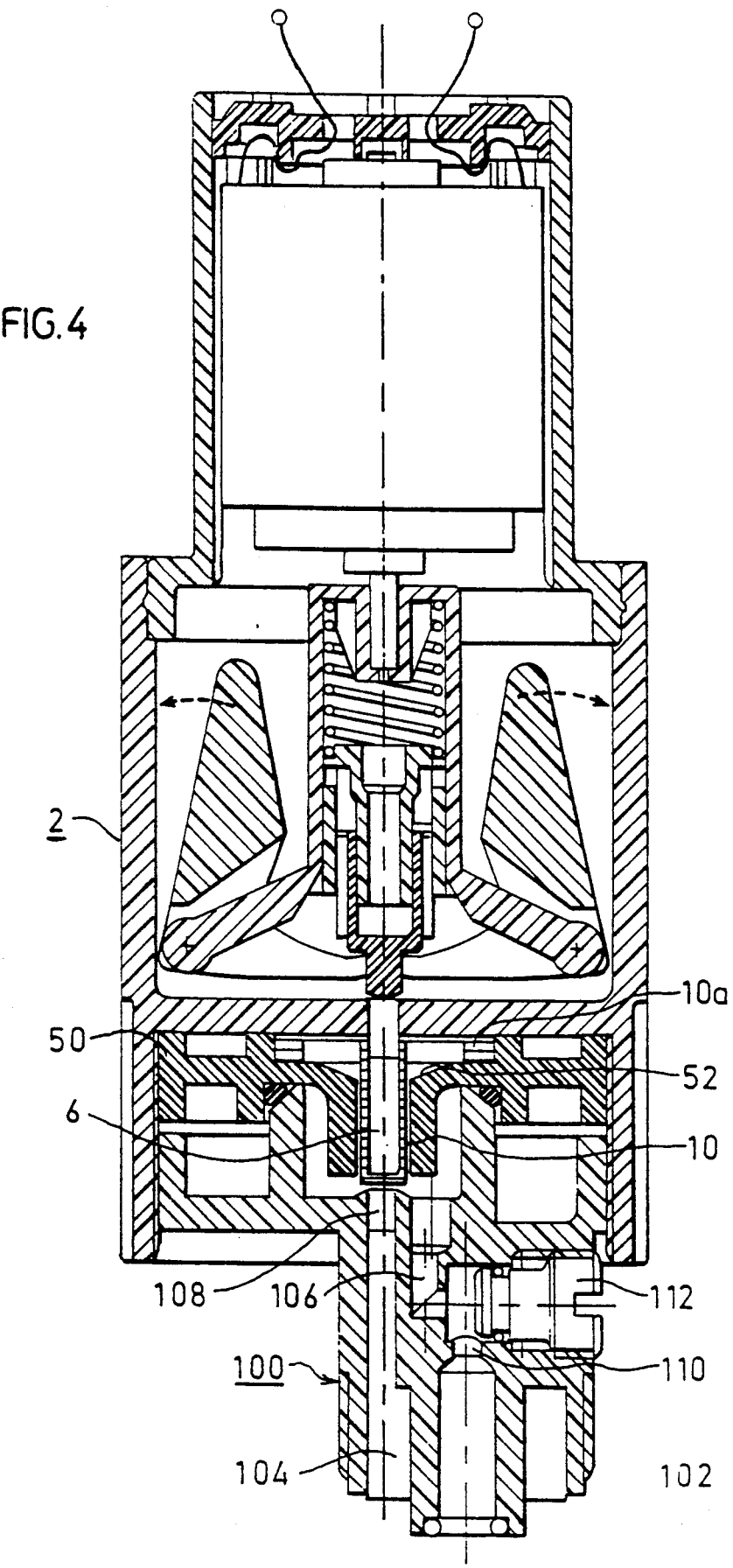
FIG. 4 is a longitudinal sectional view illustrating an electrical valve actuator constructed in accordance with the present invention.

FIG. 4 illustrates an electrical actuator constructed as described above with respect to FIGS. 1–3 for actuating a valve assembly. To simplify the description, the elements of the actuator common to those described above with respect to FIGS. 1–3 are identified by the same reference numerals. In addition, FIG. 4 illustrates a clamping member 50 threaded to an extension of the actuator housing 2, for clamping the diaphragm 10 to the actuator housing. For this purpose, the clamping member 50 is formed with an annular recess 52 receiving a thickened bead 10a of the diaphragm 10.

The actuator illustrated in FIG. 4 is otherwise constructed, and operates, in the same manner as described above with respect to FIGS. 1–3.

The valve assembly controlled by the actuator includes an adaptor member 100 threaded to the extension of the actuator housing 2. Adaptor member 100 is formed with an inlet 102 connected to an outlet 104 by a passageway 106. The latter passageway is formed with a first orifice 108 aligned with the end of the actuator pin 6, and controlled thereby. Passageway 106 is further formed with a second orifice 110 controlled by a manual shut-off screw 112.

FIG. 4 illustrates the actuator pin 6 in its retracted position, which it assumes when the motor 4 is not energized. As soon as motor 4 is energized, pin 6 is projected outwardly, as described above with respect to FIGS. 1–3, to block orifice 108, and thereby to shut-off the flow of the fluid from the inlet 102 to the outlet 104. As soon as motor 4 is de-energized, the pin 6 remains in its projected position by the extension-retraction mechanism (24, FIG. 1), blocking orifice 108 and thereby blocking the flow from the inlet to the outlet. When it is desired to re-establish the flow, motor 4 is again energized to actuate the extension-retraction mechanism which allows pin 6 to retract inwardly by diaphragm seal 10. The fluid flow may also be shut-off by manually threading screw 112 to block orifice 110.

While the invention has been described with respect to one particular extension-retraction mechanism 24, it will be appreciated that this is set forth merely for purposes of example, and that any extension-retraction mechanism, which sequentially extends and retracts the actuator member after each actuation thereof and retains it in the respective position until the next actuation thereof, such as commonly used in conventional ball-point pens, may also be used for this purpose. Many other variations, modifications and applications of the invention will be apparent.

What is claimed is:

1. An electrical actuator for actuating a valve or other device, comprising:
    an electrical motor having a rotary shaft;
    a rotary member coupled to said rotary shaft so as to be rotated thereby;
    a centrifugal body movably mounted to said rotary member and biassed so as normally to assume an inner position with respect to the rotary axis of the rotary member, and to move to an outer position by centrifugal force when the rotary member rotates;
    an actuator pin normally biassed by a non-actuating position but movable to an actuating position;
    a housing enclosing said rotary member and centrifugal body and open at one end;
    a diaphragm seal closing said open end of the housing and displaceable outwardly with respect to said housing when the actuator pin is moved to its actuating position;
    and coupling means between said centrifugal body and said actuator pin for actuating said actuator pin to its actuating position, and thereby for displacing said diaphragm outwardly with respect to said housing, when the centrifugal body is moved to its outer position by centrifugal force upon the rotation of said rotary member by said electric motor.

2. The assembly according to claim 1, wherein said actuator pin is reciprocatably mounted for movement to its actuating and non-actuating positions.

3. The assembly according to claim 2, wherein said centrifugal body is pivotally mounted to said rotary member and is biassed by its own weight so as normally to assume said inner position.

4. The assembly according to claim 3, wherein said centrifugal body includes first and second legs on opposite sides of its pivotal mounting;
    said first leg normally be located inwardly of its pivotal mounting and of a weight to bias the leg to an inner position, but pivotal outwardly by centrifugal force upon the rotation of the rotary member;
    said second leg being coupled via said coupling means to the actuator member to actuate it upon the movement of the first leg outwardly by centrifugal force upon rotation of the rotary member.

5. The assembly according to claim 4, wherein said coupling means comprises an interposer pin engageable with one end of said actuator pin, the opposite end of said actuator pin engaging said diaphragm seal, said interposer pin being formed with a shoulder engageable by said second leg of the centrifugal body to move the interposer pin to its actuating position upon the movement of the first leg of the centrifugal body outwardly by centrifugal force during rotation of the rotary member.

6. The assembly according to claim 5, wherein said shoulder is in an annular shoulder formed on the interposer pin, and wherein there are a plurality of said centrifugal bodies each pivotally mounted on said rotary member and each having a first leg movable outwardly by centrifugal force, and a second leg engaging said annular shoulder.

7. The assembly according to claim 5, further including a housing enclosing said rotary member and centrifugal body, said actuator pin projecting through an opening in said housing.

8. The assembly according to claim 7, wherein the end of said actuator pin projecting through said opening in the housing, and said opening in the housing, are covered by a diaphragm seal.

9. The assembly according to claim 1, further including an extension-retraction mechanism cooperable with said actuator member for sequentially extending and retracting said actuator member after each actuation thereof and for retaining it in the respective position until the next actuation thereof.

10. An electrical valve actuator including an actuator according to claim 1, and a valve assembly secured to the actuator and having an orifice controlled by said actuator member.

11. An electrical actuator for actuating a valve or other device, comprising:

an electrical motor having a rotary shaft;

a rotary member coupled to said rotary shaft so as to be rotated thereby;

a centrifugal body movably mounted to said rotary member and biassed so as normally to assume an inner position with respect to the rotary axis of the rotary member, and to move to an outer position by centrifugal force when the rotary member rotates;

an actuator member normally biassed to a non-actuating position but movable to an actuating position;

coupling means between said centrifugal body and said actuator member for actuating said actuator member to its actuating position when the centrifugal body is moved to its outer position by centrifugal force upon the rotation of said rotary member by said electric motor;

and an extension-retraction mechanism cooperable with said actuator member for sequentially extending and retracting said actuator member after each actuation thereof and for retaining it in the respective position until the next actuation thereof.

12. The assembly according to claim 11, wherein said actuator member is reciprocatably mounted for movement to its actuating and non-actuating positions.

13. The assembly according to claim 12, wherein said centrifugal body is pivotally mounted to said rotary member and is biassed by its own weight so as normally to assume said inner position.

14. The assembly according to claim 13, wherein said centrifugal body includes first and second legs on opposite sides of its pivotal mounting;

said first leg normally be located inwardly of its pivotal mounting and of a weight to bias the leg to an inner position, but pivotal outwardly by centrifugal force upon the rotation of the rotary member;

said second leg being coupled via said coupling means to the actuator member to actuate it upon the movement of the first leg outwardly by centrifugal force upon rotation of the rotary member.

15. The assembly according to claim 14, wherein said actuator member comprises an actuator pin, and said coupling means comprises an interposer pin engageable with said actuator pin, said interposer pin being formed with a shoulder engageable by said second leg of the centrifugal body to move the interposer pin to its actuating position upon the movement of the first leg of the centrifugal body outwardly by centrifugal force during rotation of the rotary member.

* * * * *